United States Patent
Hong

(10) Patent No.: US 12,273,857 B2
(45) Date of Patent: Apr. 8, 2025

(54) PAGING METHOD

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 372 days.

(21) Appl. No.: 17/776,209

(22) PCT Filed: Nov. 14, 2019

(86) PCT No.: PCT/CN2019/118371
§ 371 (c)(1),
(2) Date: May 11, 2022

(87) PCT Pub. No.: WO2021/092843
PCT Pub. Date: May 20, 2021

(65) Prior Publication Data
US 2022/0394670 A1 Dec. 8, 2022

(51) Int. Cl.
*H04W 68/02* (2009.01)
*H04W 48/08* (2009.01)

(52) U.S. Cl.
CPC .......... *H04W 68/02* (2013.01); *H04W 48/08* (2013.01)

(58) Field of Classification Search
CPC ..... H04W 48/18; H04W 76/10; H04W 68/02; H04W 72/23; H04W 74/0833;
(Continued)

(56) References Cited

U.S. PATENT DOCUMENTS 9,888,455 B1    2/2018  Laslo Amit et al.
2015/0296482 A1* 10/2015  Baskar .................. H04W 68/04
                                                370/312
(Continued)

FOREIGN PATENT DOCUMENTS

CN     108605281 A     9/2018
CN     109983792 A     7/2019
(Continued)

OTHER PUBLICATIONS

State Intellectual Property Office of the People's Republic of China, Office Action and Search Report Issued in Application No. 2019800030474, Dec. 28, 2021, 15 pages. (Submitted with Machine/Partial Translation).
(Continued)

*Primary Examiner* — Olumide Ajibade Akonai
(74) *Attorney, Agent, or Firm* — Arch & Lake LLP; Hao Tan; Shen Wang

(57) ABSTRACT

Paging methods and paging apparatuses are disclosed. In some aspects, one of the paging methods includes: determining, by a core network, a target tracking area where a terminal to be paged is currently located; determining, by the core network, target slice information of a target network slice corresponding to current service of the terminal; determining, by the core network, at least one target base station supporting the target network slice among a plurality of base stations in the target tracking area according to the target slice information; and sending first paging signaling for paging the terminal to the at least one target base station.

9 Claims, 8 Drawing Sheets

(58) Field of Classification Search
CPC ..... H04W 76/27; H04W 76/19; H04W 48/12; H04W 76/11; H04W 72/0446; H04W 74/006; H04W 48/20; H04W 68/025; H04W 68/005; H04W 68/04; H04W 36/0011; H04W 36/0058; H04W 36/08; H04W 76/15; H04W 36/0064; H04W 36/14; H04W 36/0005; H04W 36/0072; H04W 36/0016; H04W 48/08; H04W 36/0077
See application file for complete search history.

(56) References Cited

U.S. PATENT DOCUMENTS

| | | | |
|---|---|---|---|
| 2018/0160395 A1 | 6/2018 | Laslo-Amit et al. | |
| 2018/0302877 A1* | 10/2018 | Bosch | H04W 68/02 |
| 2018/0317148 A1* | 11/2018 | Jin | H04W 36/0033 |
| 2018/0317163 A1 | 11/2018 | Lee et al. | |
| 2019/0357131 A1 | 11/2019 | Sivavakeesar et al. | |
| 2020/0022033 A1* | 1/2020 | Wei | H04W 36/0064 |
| 2020/0120548 A1* | 4/2020 | Jin | H04W 36/28 |
| 2021/0058892 A1* | 2/2021 | Tang | H04W 68/005 |
| 2021/0144674 A1* | 5/2021 | Zhang | H04W 72/23 |

FOREIGN PATENT DOCUMENTS

| | | |
|---|---|---|
| CN | 110036675 A | 7/2019 |
| CN | 110402588 A | 11/2019 |
| EP | 3512272 A | 7/2019 |
| WO | 2019194642 A | 10/2019 |

OTHER PUBLICATIONS

ISA State Intellectual Property Office of the People's Republic of China, International Search Report Issued in Application No. PCT/CN2019/118371, Jun. 4, 2021, WIPO, 4 pages.

Ericsson, "Mobility procedures for Slicing", 3GPP TSG RAN WG3 NR AdHoc 1801, Sophia Antipolis, France, Jan. 22-26, 2018, R3-180386, 6 pages.

Samsung R&D Institute UK et al., "Mandating support for slicing in UE and network", 3GPP TSG-CT WG1 Meeting #110, Kunming (P.R. of China), Apr. 16-20, 2018, C1-182052, 6 pages.

* cited by examiner

PAGING METHOD

CROSS REFERENCE TO RELATED APPLICATIONS

This application is the national phase of International Application No. PCT/CN2019/118371 filed on Nov. 14, 2019, the disclosure of which is hereby incorporated by reference in its entirety for all purposes.

TECHNICAL FIELD

The present disclosure relates to the field of communication, in particular to paging methods, a core network and a base station.

BACKGROUND

In a 5th Generation Mobile Communication Technology (5G) network, a cellular network model with a dedicated support system and an Information Technology (IT) system can no longer meet different demands of all walks of life for the network in the 5G era. It is necessary to flexibly adjust and combine network performance indicators such as speed, capacity, and coverage of a network to meet individual needs of different services.

SUMMARY

The present disclosure provides a paging method, a core network and a base station.

According to a first aspect of the present disclosure, there is provided a paging method. The method is performed by a core network and includes:
  determining a target tracking area where a terminal to be paged is currently located;
  determining target slice information of a target network slice corresponding to current service of the terminal;
  determining at least one target base station supporting the target network slice among a plurality of base stations in the target tracking area according to the target slice information; and
  sending first paging signaling for paging the terminal to the at least one target base station.

According to a second aspect of the present disclosure, there is provided a paging method. The method is performed by a base station and includes:
  receiving first paging signaling for paging a terminal, where the first paging signaling is sent from a core network to the base station after determining that the base station is in a target tracking area and supports a target network slice; and sending second paging signaling to page the terminal according to the first paging signaling.

According to a third aspect of the present disclosure, there is provided a core network and the core network includes:
  a processor; and
  a memory configured to store instructions executable by the processor,
  where the processor is configured to:
  determine a target tracking area where a terminal to be paged is currently located;
  determine target slice information of a target network slice corresponding to current service of the terminal;
  determine at least one target base station supporting the target network slice among a plurality of base stations in the target tracking area according to the target slice information; and
  send first paging signaling for paging the terminal to the at least one target base station.

It should be understood that the above general description and the following detailed description are exemplary and explanatory only, and do not limit the present disclosure.

BRIEF DESCRIPTION OF THE DRAWINGS

The accompanying drawings, which are incorporated into and constitute a part of the specification, illustrate examples consistent with the present disclosure, and together with the specification serve to explain the principles of the present disclosure.

DETAILED DESCRIPTION

Figure 1A:
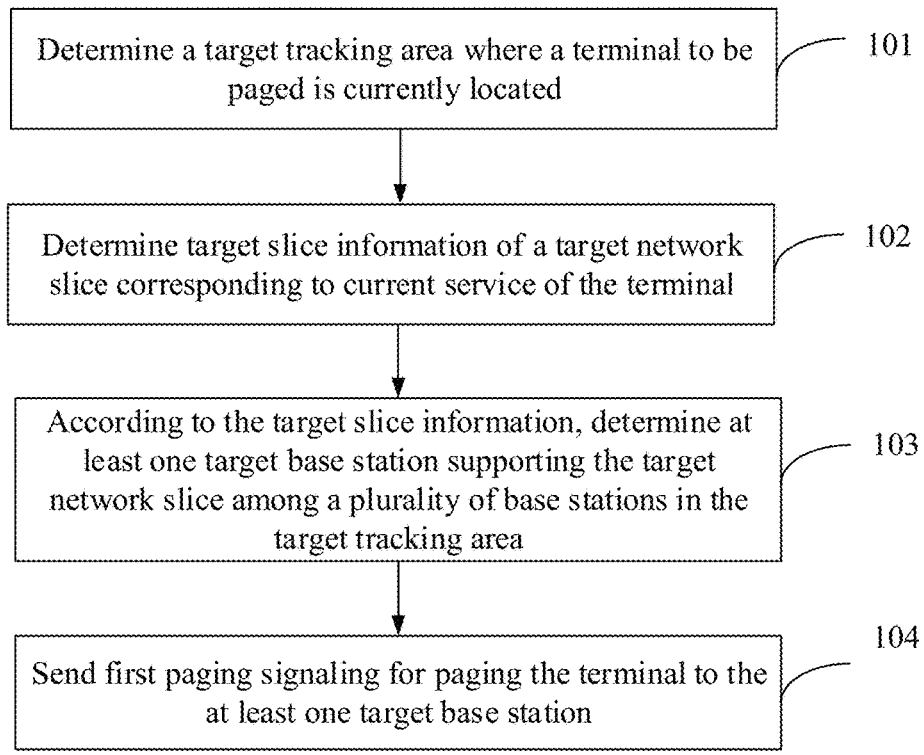
FIG. 1A is a schematic flowchart illustrating a paging method according to one or more examples of the present disclosure.

Exemplary embodiments will be described in detail herein, examples of which are illustrated in the accompanying drawings. When the following description refers to the drawings, unless otherwise indicated, the same numerals in different drawings indicate the same or similar elements. The exemplary embodiments described below do not represent all embodiments consistent with the present disclosure. Rather, they are merely examples of device and method consistent with some aspects of the present disclosure, as recited in the appended claims.

Terms used in the present disclosure are for the purpose of describing specific embodiments only, and are not intended to limit the present disclosure. The singular forms "a", "the" and "this" used in the present disclosure and the appended claims are also intended to include plural forms, unless the context clearly indicates other meanings. It should also be understood that the term "and/or" as used herein refers to and includes any and all possible combinations of one or more of the associated listed items.

It should be understood that although terms first, second, third, etc. may be used in the present disclosure to describe various information, such information should not be limited to these terms. These terms are only used to distinguish the same type of information from each other. For example, first information may also be referred to as second information, and similarly, the second information may also be referred to as the first information without departing from the scope of the present disclosure. Depending on the context, the word "if" as used herein can be interpreted as "at the time of", "when" or "in response to determining".

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Network slicing is one of the means to meet individual needs of different services. By slicing network resources, a single physical network can be divided into a plurality of logical virtual networks, and independent network slices can be allocated for typical business scenarios. In the slices, an enhanced network architecture can be designed according to business requirements to achieve appropriate resource allocation and process optimization. A plurality of network slices share network infrastructure, thus improving network resource utilization and providing optimal support for different services used by different user groups.

Different terminals can support different network slices, and according to the current 3rd Generation Partnership Project (3GPP) protocol, a terminal can support up to 8 network slices at the same time. Different base stations can also support different types of network slices. According to the 3GPP protocol, the current paging mechanism is that when a core network wants to page a terminal, the core network will send paging signaling to all base stations in a tracking area (TA) where the terminal is located, and base stations that receive the paging signaling from the core network will send paging signaling to page the terminal. Even if a certain base station in the TA where the terminal is located does not support a current service of the terminal, the core network needs to send paging signaling to the base station, and the base station needs further to send paging signaling to page the terminal.

A paging method provided by the examples of the present disclosure is first introduced from a core network side below.

An example of the present disclosure provides a paging method, which can be used in a core network. Referring to FIG. 1A, FIG. 1A is a flowchart illustrating a paging method according to an example, and the method may include steps 101 to 104.

In step 101, a target tracking area where a terminal to be paged is currently located is determined.

In the example of the present disclosure, the terminal to be paged by the core network is currently in an idle state, and when there is a service to be transmitted to the terminal, the core network can first determine the target tracking area where the terminal is currently located.

In step 102, target slice information of a target network slice corresponding to current service of the terminal is determined.

In this step, the core network may also determine the target slice information of the corresponding target network slice according to the current service of the terminal. In some examples, the target slice information may be a slice identity of the target network slice.

For example, if the current service of the terminal is Enhanced Mobile Broadband (eMBB), the slice identity of the target network slice corresponding to the service is network slice 1, and the core network takes the slice identity as the target slice information.

Figure 1B:
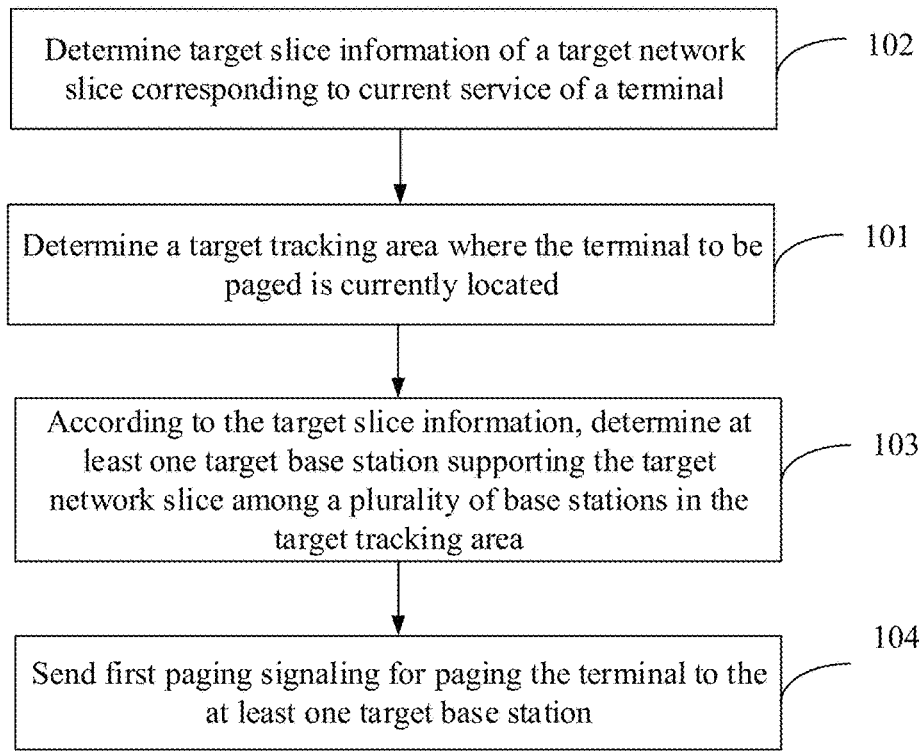
FIG. 1B is a schematic flowchart illustrating a paging method according to one or more examples of the present disclosure.

In the examples of the present disclosure, the execution order of step 101 and step 102 is not limited, that is, step 101 may be performed before step 102, as shown in FIG. 1A, or step 102 may be performed before step 101, as shown in FIG. 1B, or step 101 and step 102 may be performed synchronously (not shown in the figure).

In step 103, according to the target slice information, at least one target base station supporting the target network slice is determined among a plurality of base stations in the target tracking area.

Figure 2:
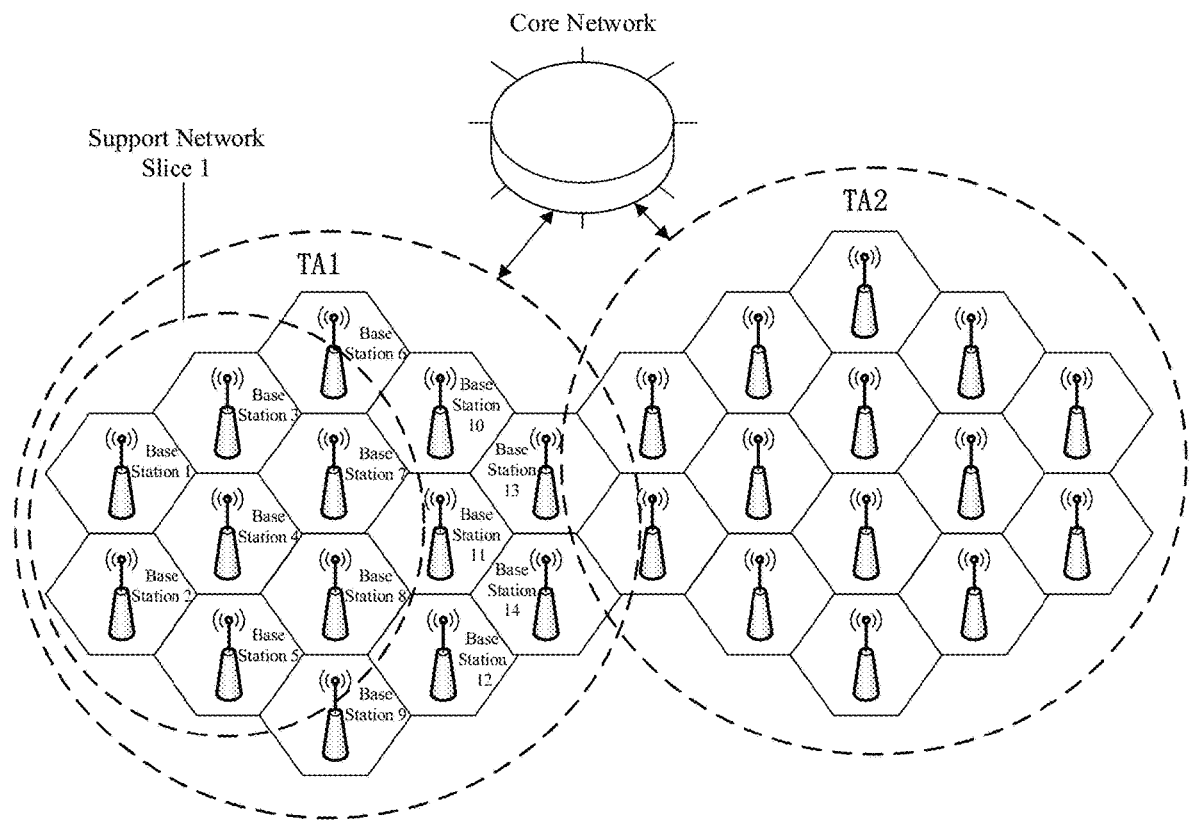
FIG. 2 is a schematic diagram illustrating a paging scenario according to one or more examples of the present disclosure.

For example, as shown in FIG. 2, the target slice information is network slice 1, and the target tracking area is TA1. In TA1, base stations 1, 2, 3, 4, 5, 7 and 8 support network slice 1, and other base stations, i.e., base stations 6, 9, 10, 11, 12, 13 and 14, support network slice 2. In this case, the core network can take the base stations 1, 2, 3, 4, 5, 7 and 8 as target base stations.

In step 104, first paging signaling for paging the terminal is sent to the at least one target base station.

Figure 3:
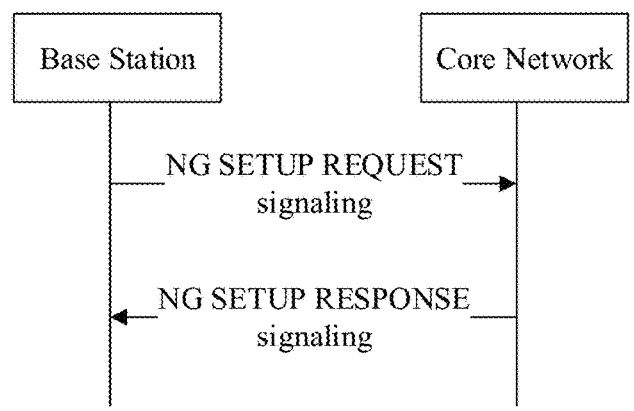
FIG. 3 is a schematic diagram illustrating interaction between a core network and a base station according to one or more examples of the present disclosure.

In this step, the core network no longer needs to send the first paging signaling to all base stations in the target tracking area, such as the base station 1 to the base station 14 in TA1 in FIG. 3, but only needs to send the first paging signal to the at least one target base station. For example, the core network only needs to send the first paging signaling to the base stations 1, 2, 3, 4, 5, 7 and 8 in TA1 in FIG. 3, thus achieving the purpose of saving signaling resources between the core network and base stations.

In the above example, the core network may determine the target tracking area where the terminal to be paged is currently located, and determine the target slice information of the target network slice corresponding to the current service of the terminal, so that the at least one target base station supporting the target network slice is determined among the plurality of base stations in the target tracking area according to the target slice information. The core network only sends the first paging signaling for paging the terminal to the at least one target base station, thus achieving the purpose of saving signaling resources between the core network and base stations.

Any technical solution that the core network only sends the first paging signaling to the at least one target base station in the target tracking area by changing the order of steps in the example of the present disclosure, thus saving signaling resources between the core network and base stations, should belong to the protection scope of the present disclosure. Similarly, in the 5G implementation standard, any solution that can achieve the technical effect of the present disclosure by adjusting the execution order of the above steps belongs to the protection scope of the present disclosure.

Figure 4A:
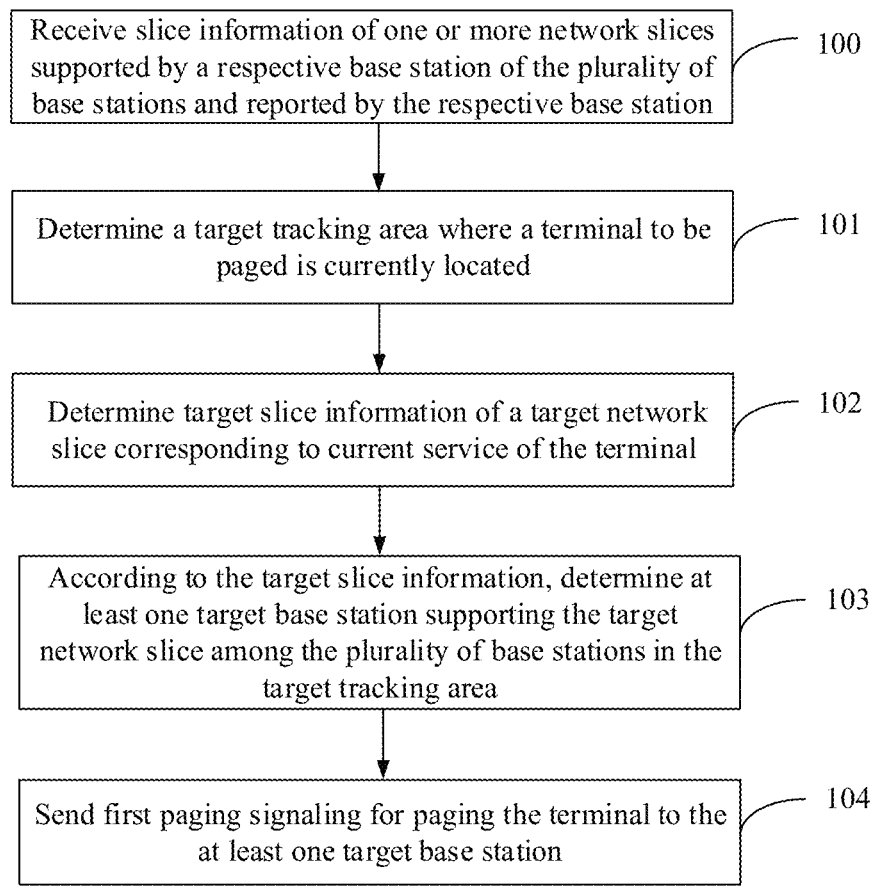
FIG. 4A is a schematic flowchart illustrating another paging method according to one or more examples of the present disclosure.

In an optional example, referring to FIG. 4A, FIG. 4A is a flowchart illustrating another paging method according to the example shown in FIG. 1A. The above method further includes step 100.

In step 100, slice information of one or more network slices, supported by a respective base station of the plurality of base stations and reported by the respective base station, is received.

The core network may receive the slice information of the network slice supported by the respective base station reported by the respective base station in advance, where each base station supports at least one network slice.

For example, base station m supports network slices 1, 3 and 4, base station n supports network slice 2.

The above step 103 may include:
among the plurality of base stations in the target tracking area, at least one base station of which the slice information includes the target slice information is taken as the target base station.

In the example of the present disclosure, the core network may, among the plurality of base stations in the target tracking area, take the at least one base station of which the slice information includes the target slice information of the target network slice corresponding to the current service of the terminal as the target base station according to the slice information previously reported by each base station.

For example, if the slice information of respectively supported one or more network slices previously reported by the base stations 1, 2, 3, 4, 5, 7 and 8 in the target tracking area includes the target slice information, the core network directly takes the base stations 1, 2, 3, 4, 5, 7 and 8 as the target base stations.

In the above example, the core network may also receive the slice information of respectively supported one or more network slices reported by the respective base station, and after the target tracking area where the terminal is located is determined, take the at least one base station of which the slice information includes the target slice information of the target network slice corresponding to the current service of the terminal among the plurality of base stations in the target tracking area as the target base station. Through the above process, the core network can quickly determine the at least one target base station supporting the current service of the terminal among the plurality of base stations in the target tracking area, so that the core network may only send the first paging signaling to the at least one target base station subsequently, and the availability is high.

Figure 4B:
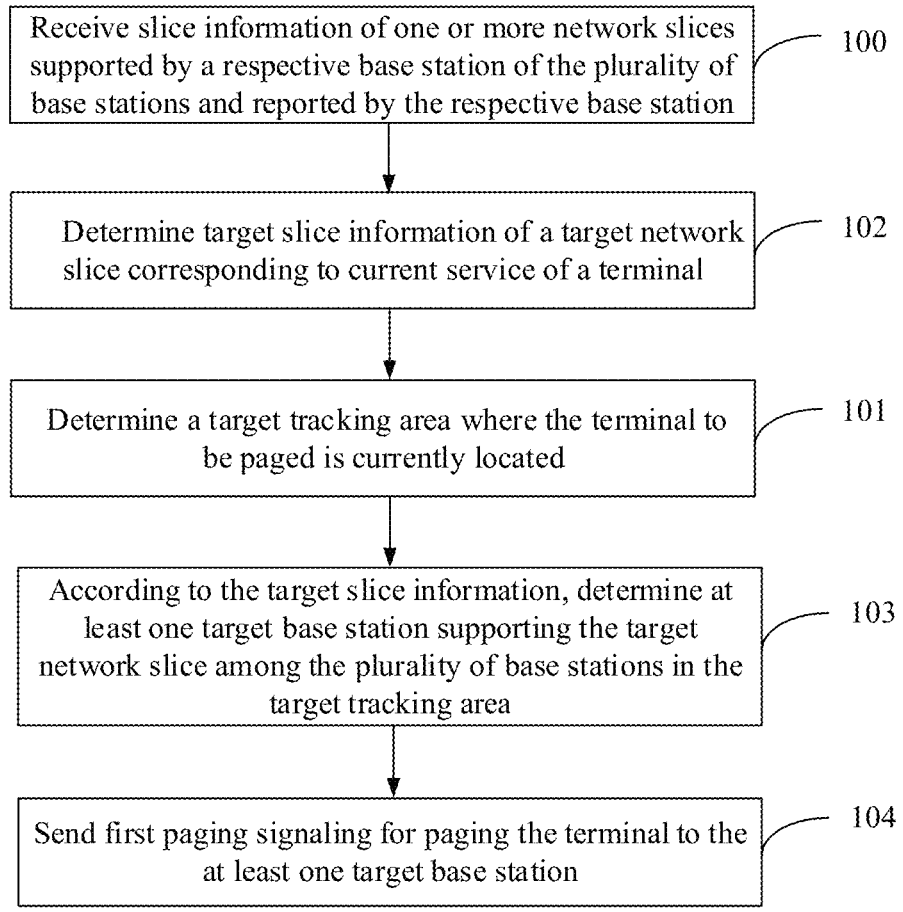
FIG. 4B is a schematic flowchart illustrating another paging method according to one or more examples of the present disclosure.

In an optional example, after step 100 is performed, the above step 102 may be performed first, and then step 101 may be performed, as shown in FIG. 4B, for example, which is not limited in the present disclosure.

In an optional example, the above step 100 may include:
the slice information of the one or more network slices supported by the respective base station of the plurality of base stations, and reported by the respective base station through a target interface with the core network, is received.

In the example of the present disclosure, the target interface may be an NG interface between the core network and the base station. For example, as shown in FIG. 3, the base station may request to establish a connection with the core network and report the slice information of the one or more network slices supported by the base station through NG SETUP REQUEST signaling of the NG interface, and the core network may confirm the establishment of a connection with the base station and the receipt of slice information through NG SETUP RESPONSE signaling.

In the above example, the core network can receive the slice information of the one or more network slices supported by the respective base station and reported by the respective base station, through the target interface between the core network itself and the respective base station, which is simple to realize and has high availability.

In an optional example, the above step 104 may include:
the first paging signaling for paging the terminal is sent to a respective target base station of the at least one target base station through a target interface between the core network and the respective target base station.

In the example of the present disclosure, after determining the at least one target base station, the core network can also send the first paging signaling for paging the terminal to the respective target base station through the target interface, such as an NG interface, between the core network and the respective target base station.

In the above example, when sending the first paging signaling for paging the terminal to the at least one target base station, the core network may send the first paging signaling through the target interface between the core network and the respective target base station, which is simple to realize and has high availability.

In an optional example, the first paging signaling for paging the terminal sent by the core network to the at least one base station may include a terminal identity of the terminal to be paged and the target slice information of the target network slice corresponding to the current service of the terminal, as shown in Table 1, for example.

TABLE 1

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| UE Paging Identity | M | | 9.3.3.18 | | YES | ignore |

TABLE 1-continued

| IE/Group Name | Presence | Range | IE type and reference | Semantics description | Criticality | Assigned Criticality |
|---|---|---|---|---|---|---|
| Paging DRX | O | | 9.3.1.90 | | YES | ignore |
| TAI List for Paging | | 1 | | | YES | ignore |
| >TAI List for Paging Item | | 1 . . . <maxnoofTAIforPaging> | | | — | |
| Paging Priority | O | | 9.3.1.78 | | YES | ignore |
| Assistance Data for Paging | O | | 9.3.1.69 | | YES | Ignore |
| Slice Support List | O | | | | | |

In the above example, the first paging signaling may include the terminal identity of the terminal to be paged by the core network and the target slice information of the target network slice corresponding to the current service of the terminal. The base station can send second paging signaling to page the terminal according to the terminal identity and the target slice information subsequently, so that the paged terminal can establish a connection with the network side more accurately.

Next, a paging method provided by the examples of the present disclosure will be introduced from a base station side.

Figure 5:
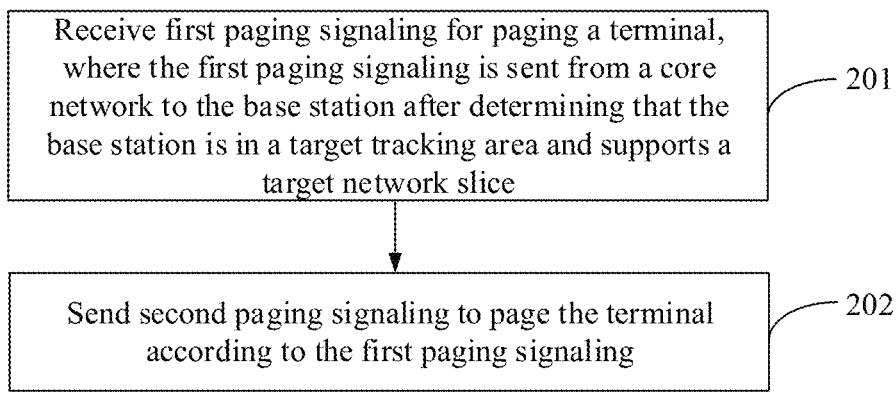
FIG. 5 is a schematic flowchart illustrating another paging method according to one or more examples of the present disclosure.

Referring to FIG. 5, FIG. 5 is a flowchart illustrating a paging method according to an example. The method is used in a base station, and includes steps 201 to 202.

In step 201, first paging signaling for paging a terminal is received, where the first paging signaling is sent from a core network to the base station after determining that the base station is in a target tracking area and supports a target network slice.

After determining that the base station is in the target tracking area and the base station supports the target network slice, the core network may send the first paging signaling to the base station through a target interface, such as an NG interface, between the core network and the base station.

In step 202, second paging signaling is sent to page the terminal according to the first paging signaling.

In this step, the base station may send the second paging signaling through an air interface according to the first paging signaling sent by the core network to page the terminal in the idle state.

In the above example, the base station may receive the first paging signaling for paging the terminal, where the first paging signaling is sent from the core network to the base station after determining that the base station is in the target tracking area and supports the target network slice. Further, the base station may send the second paging signaling to page the terminal according to the first paging signaling. Signaling resources between the base station and the terminal are saved, and the power consumption of the terminal caused by all base stations in the target tracking area sending paging signaling to the terminal is avoided, thus saving the power of the terminal.

In an optional example, the first paging signaling sent by the core network includes a terminal identity of the terminal and target slice information of the target network slice, and the above step 202 may include:

the second paging signaling carrying the terminal identity and the target slice information is sent to page the terminal.

After receiving the second paging signaling sent by the base station, the terminal can determine whether the terminal itself is a terminal that is paged by the core network according to the terminal identity. After determining that the terminal itself is the terminal that is paged by the core network, the terminal can establish a connection with the network side through the target network slice corresponding to the target slice information in at least one network slice supported by the terminal itself according to the target slice information, thus realizing the purpose that the terminal can establish a connection with the network side more accurately.

In the above example, if the first paging signaling sent by the core network to the base station includes the terminal identity of the terminal to be paged and the target slice information corresponding to the current service of the terminal, the base station may carry the terminal identity and the target slice information in the second paging signaling when sending the second paging signaling to page the terminal, so that the terminal can better establish a connection with the network side according to the terminal identity and the target slice information.

Figure 6:
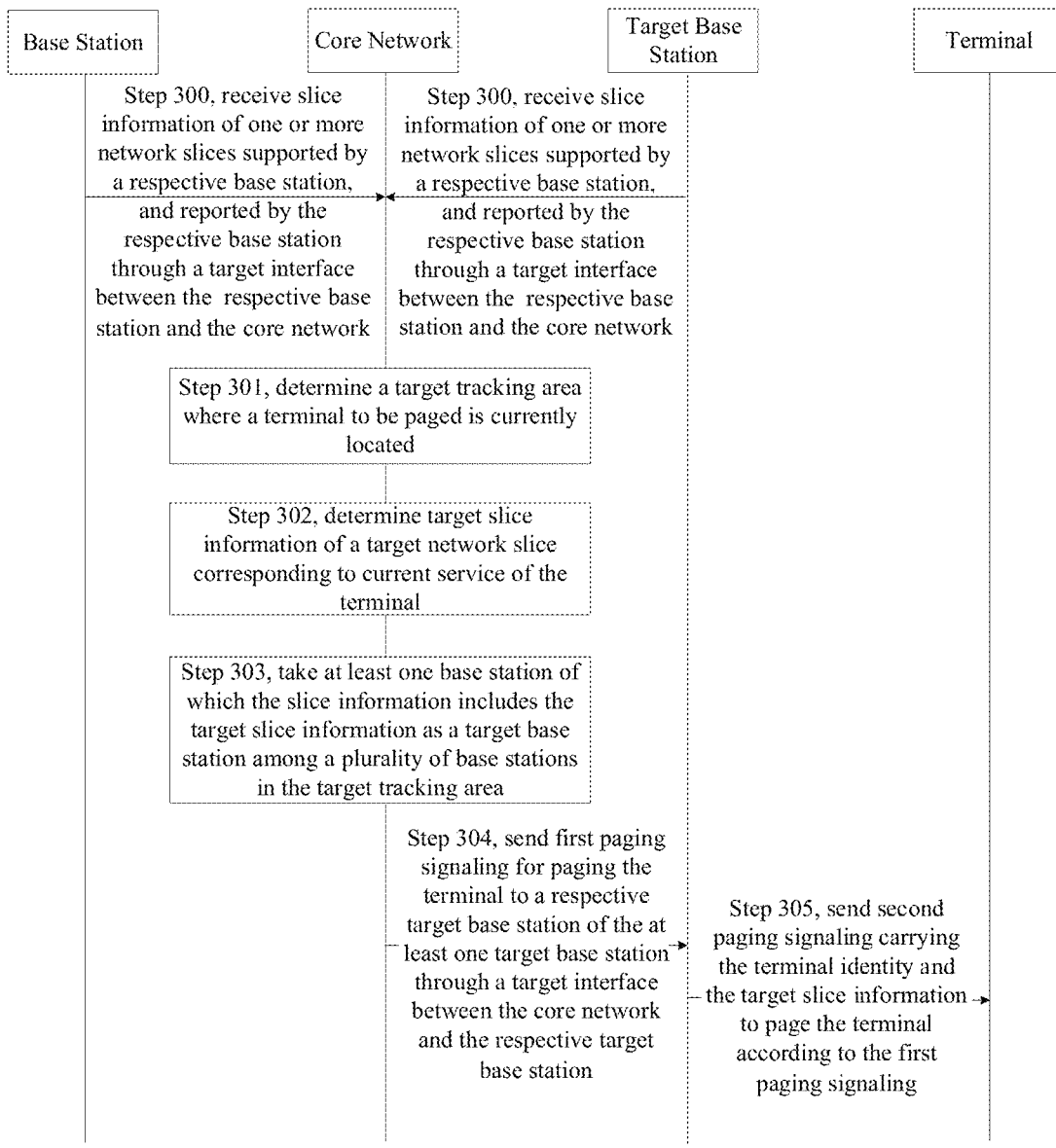
FIG. 6 is a schematic flowchart illustrating another paging method according to one or more examples of the present disclosure.

In an optional example, referring to FIG. 6, FIG. 6 is a flowchart illustrating another paging method according to an example. The method may include the steps 300 to 305.

In step 300, a core network receives, slice information of one or more network slices supported by a respective base station of one or more base stations, and reported by the respective base station through a target interface between the respective base station and the core network.

The target interface may be an NG interface.

In step 301, the core network determines a target tracking area where a terminal to be paged is currently located.

In step 302, the core network determines target slice information of a target network slice corresponding to current service of the terminal.

In the example of the present disclosure, the performing order of the above steps 301 and 302 is not limited.

In step 303, the core network takes at least one base station of which the slice information includes the target slice information as a target base station among a plurality of base stations in the target tracking area.

In step 304, the core network sends first paging signaling for paging the terminal to a respective target base station of the at least one target base station through a target interface between the core network and the respective target base station.

The first paging signaling includes a terminal identity of the terminal and the target slice information.

In step 305, the at least one target base station sends second paging signaling carrying the terminal identity and the target slice information to page the terminal according to the first paging signaling.

The target base station may send the second paging signaling through an air interface.

After receiving the second paging signaling, the terminal can determine whether the terminal itself is a terminal that is paged by the core network according to the terminal identity. After determining that the terminal itself is the terminal that is paged by the core network, the terminal can establish a connection with a network side through the target network slice corresponding to the target slice information in the at least one network slice supported by the terminal itself according to the target slice information.

In the above example, the core network only sends the first paging signaling for paging the terminal to the at least one target base station, which saves signaling resources between the core network and base stations. After receiving the first paging signaling, the base station sends the second paging signaling to the terminal, which saves signaling resources between the base station and the terminal, and avoids the power consumption of the terminal caused by all base stations in the target tracking area sending paging signaling to the terminal, thus saving the power of the terminal.

Corresponding to the aforementioned examples of application function realization method, the present disclosure further provides examples of application function realization device.

Figure 7:
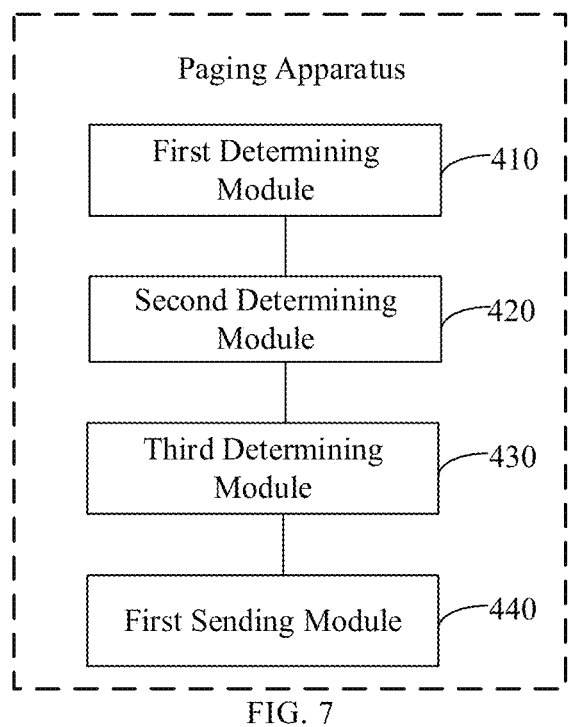
FIG. 7 is a block diagram illustrating a paging apparatus according to one or more examples of the present disclosure.
Figure 8:
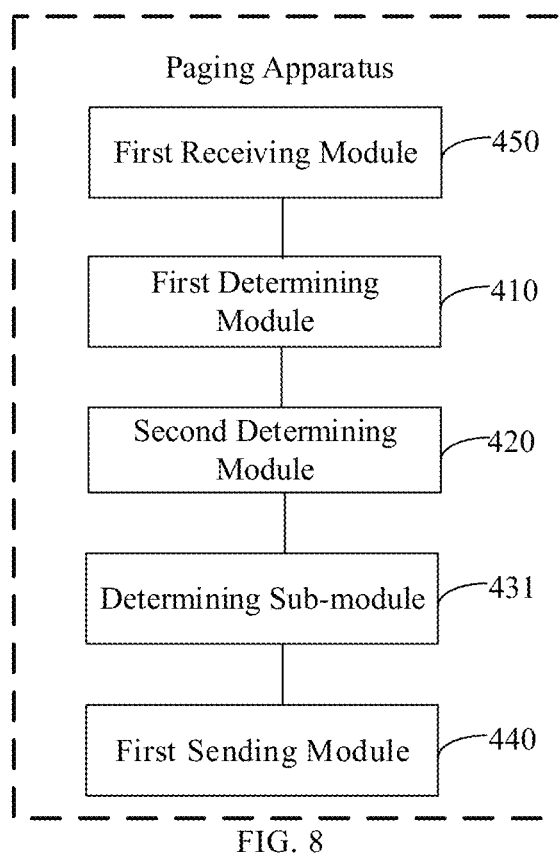
FIG. 8 is a block diagram illustrating another paging apparatus according to one or more examples of the present disclosure.

Referring to FIG. 7, FIG. 7 is a block diagram illustrating a paging apparatus according to an example. The apparatus is used in a core network and includes:
  a first determining module 410, configured to determine a target tracking area where a terminal to be paged is currently located;
  a second determining module 420, configured to determine target slice information of a target network slice corresponding to current service of the terminal;
  a third determining module 430, configured to determine at least one target base station supporting the target network slice among a plurality of base stations in the target tracking area according to the target slice information; and
  a first sending module 440, configured to send first paging signaling for paging the terminal to the at least one target base station Referring to FIG. 8, FIG. 8 is a block diagram illustrating another paging apparatus on the basis of the example shown in FIG. 7. The apparatus further includes:
  a first receiving module 450, configured to receive slice information of one or more network slices supported by a respective base station of the plurality of base stations and reported by the respective base station;
  where the third determining module 430 includes:
    a determining sub-module 431, configured to take at least one base station of which the slice information includes the target slice information among the plurality of base stations in the target tracking area as the target base station.

Figure 9:
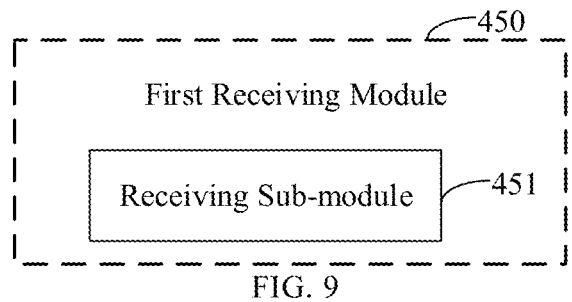
FIG. 9 is a block diagram illustrating another paging apparatus according to one or more examples of the present disclosure.

Referring to FIG. 9, FIG. 9 is a block diagram illustrating another paging apparatus on the basis of the example shown in FIG. 8. The first receiving module 450 includes:
  a receiving sub-module 451, configured to receive, the slice information of the one or more network slices supported by the respective base station of the plurality of base stations, and reported by the respective base station through a target interface with the core network.

Figure 10:
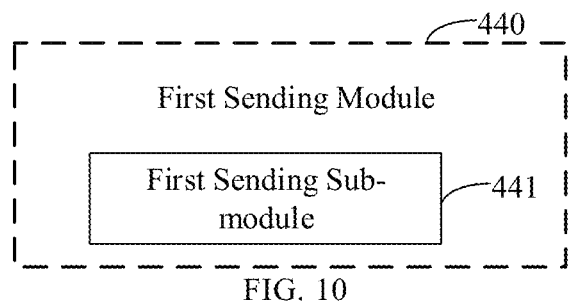
FIG. 10 is a block diagram illustrating another paging apparatus according to one or more examples of the present disclosure.

Referring to FIG. 10, FIG. 10 is a block diagram illustrating another paging apparatus on the basis of the example shown in FIG. 7. The first sending module 440 includes:
  a first sending sub-module 441, configured to send the first paging signaling for paging the terminal to a respective target base station of the at least one target base station through a target interface between the core network and the respective target base station.

In some examples, the first paging signaling includes a terminal identity of the terminal and the target slice information.

Figure 11:
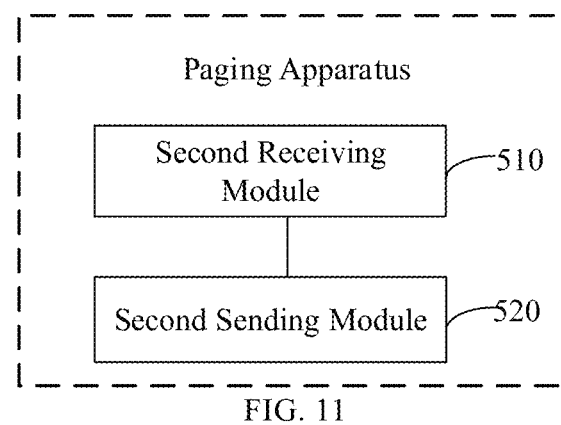
FIG. 11 is a block diagram illustrating another paging apparatus according to one or more examples of the present disclosure.

Referring to FIG. 11, FIG. 11 is a block diagram illustrating another paging apparatus according to an example. The apparatus is used in a base station and includes:
  a second receiving module 510, configured to receive first paging signaling for paging a terminal, where the first paging signaling is sent from a core network to the base station after determining that the base station is in a target tracking area and supports a target network slice; and
  a second sending module 520, configured to send second paging signaling to page the terminal according to the first paging signaling.

In some examples, the first paging signaling includes a terminal identity of the terminal and target slice information of the target network slice.

Figure 12:
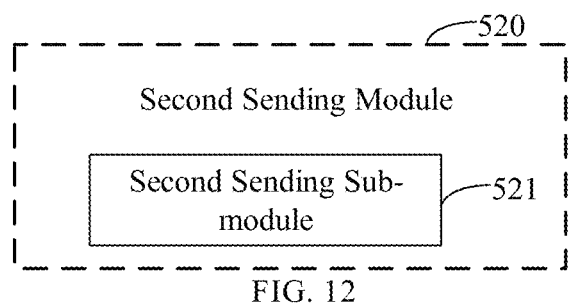
FIG. 12 is a block diagram illustrating another paging apparatus according to one or more examples of the present disclosure.

Referring to FIG. 12, FIG. 12 is a block diagram illustrating another paging apparatus on the basis of the example shown in FIG. 11. The second sending module 520 includes:
  a second sending sub-module 521, configured to send the second paging signaling carrying the terminal identity and the target slice information to page the terminal.

Since the apparatus examples basically correspond to the method examples, reference may be made to partial descriptions of the method examples for related parts. The device examples described above are only schematic, in which the units described as separate components may or may not be physically separated. The components shown as units may or may not be physical units. That is, these components may be located in one place or distributed over a plurality of network units. Some or all of the modules can be selected according to actual needs to achieve the purpose of the solutions of the present disclosure. Those of ordinary skill in the art can understand and implement the present disclosure without creative labor.

Correspondingly, the present disclosure further provides a paging apparatus. The paging apparatus is used in a core network and includes:
  a processor; and
  a memory configured to store instructions executable by the processor,
  where the processor is configured to:
  determine a target tracking area where a terminal to be paged is currently located;
  determine target slice information of a target network slice corresponding to current service of the terminal;
  determine at least one target base station supporting the target network slice among a plurality of base stations in the target tracking area according to the target slice information; and send first paging signaling for paging the terminal to the at least one target base station.

Figure 13:
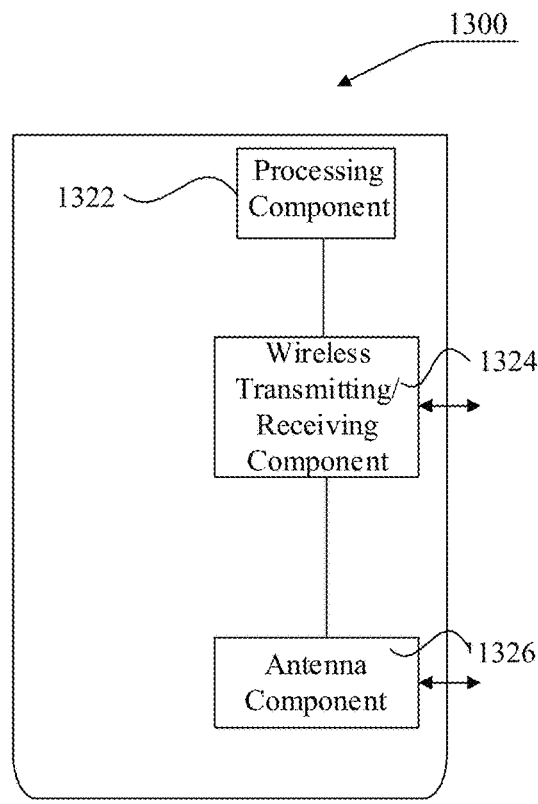
FIG. 13 is a schematic structural diagram illustrating a paging apparatus according to one or more examples of the present disclosure.

As shown in FIG. 13, FIG. 13 is a schematic structural diagram illustrating a paging apparatus 1300 according to an example. The apparatus 1300 may be provided as a core network. Referring to FIG. 13, the apparatus 1300 includes a processing component 1322, a wireless transmitting/receiving component 1324, an antenna component 1326, and a signal processing part specific to a wireless interface. The processing component 1322 may further include one or more processors.

One of the processors in the processing component 1322 may be configured to perform any one of the above paging methods on the core network side.

Correspondingly, the present disclosure further provides a paging apparatus. The paging apparatus is used in a base station and includes:

a processor;

a memory configured to store instructions executable by the processor;

where the processor is configured to:

receive, first paging signaling for paging a terminal, where the first paging signaling is sent from a core network to the base station after determining that the base station is in a target tracking area and supports a target network slice; and send second paging signaling to page the terminal according to the first paging signaling.

Figure 14:
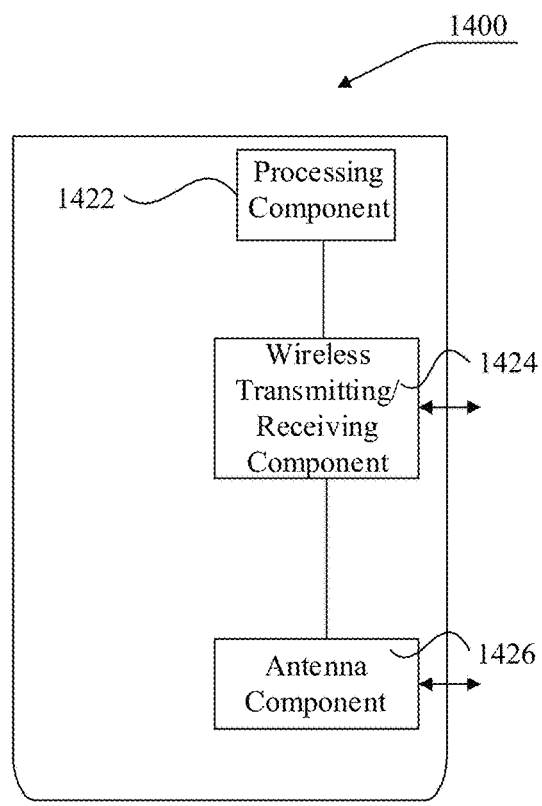
FIG. 14 is a schematic structural diagram illustrating a paging apparatus according to one or more examples of the present disclosure.

As shown in FIG. 14, FIG. 14 is a schematic structural diagram illustrating another paging apparatus 1400 according to an example. The apparatus 1400 may be provided as a base station. Referring to FIG. 14, the apparatus 1400 includes a processing component 1422, a wireless transmitting/receiving component 1424, an antenna component 1426, and a signal processing part specific to a wireless interface. The processing component 1422 may further include one or more processors.

One of the processors in the processing component 1422 may be configured to perform any one of the above paging methods on the base station side.

In the examples of the present disclosure, the core network may determine the target tracking area where the terminal to be paged is currently located, and determine the target slice information of the target network slice corresponding to the current service of the terminal, so that the at least one target base station supporting the target network slice is determined among the plurality of base stations in the target tracking area according to the target slice information. The core network only sends the first paging signaling for paging the terminal to the at least one target base station, thus achieving the purpose of saving signaling resources between the core network and base stations.

In the examples of the present disclosure, the core network may also receive the slice information of respectively supported one or more network slices reported by the respective base station, and after the target tracking area where the terminal is located is determined, take the at least one base station of which the slice information includes the target slice information of the target network slice corresponding to the current service of the terminal among the plurality of base stations in the target tracking area as the target base station. Through the above process, the core network can quickly determine the at least one target base station supporting the current service of the terminal among the plurality of base stations in the target tracking area, so that the core network may only send the first paging signaling to the at least one target base station subsequently, and the availability is high.

In the examples of the present disclosure, the core network can receive the slice information of the one or more network slices supported by the respective base station and reported by the respective base station, through the target interface between the core network itself and the respective base station, which is simple to realize and has high availability.

In the examples of the present disclosure, when sending the first paging signaling for paging the terminal to the respective target base station, the core network may send the first paging signaling through the target interface between the core network and the respective target base station, which is simple to realize and has high availability.

In the examples of the present disclosure, the first paging signaling may include the terminal identity of the terminal to be paged by the core network and the target slice information of the target network slice corresponding to the current service of the terminal. The base station can send second paging signaling to page the terminal according to the terminal identity and the target slice information subsequently, so that the paged terminal can establish a connection with the network side more accurately.

In the example of the present disclosure, the base station may receive the first paging signaling for paging the terminal sent from the core network to the base station after determining that the base station is in the target tracking area and supports the target network slice. Further, the base station may send the second paging signaling to page the terminal according to the first paging signaling. Signaling resources between the base station and the terminal are saved, and the power consumption of the terminal caused by all base stations in the target tracking area sending paging signaling to the terminal is avoided, thus saving the power of the terminal.

In the example of the present disclosure, if the first paging signaling sent by the core network to the base station includes the terminal identity of the terminal to be paged and the target slice information corresponding to the current service of the terminal, the base station may carry the terminal identity and the target slice information in the second paging signaling when sending the second paging signaling to page the terminal, so that the terminal can better establish a connection with the network side according to the terminal identity and the target slice information.

Those skilled in the art will readily recognize other examples of the present disclosure upon consideration of the specification and practice of the present disclosure disclosed herein. The present disclosure is intended to cover any variations, uses, or adaptations of the present disclosure, which follow general principles of the present disclosure and include common knowledge or customary means in the art that are not disclosed in the present disclosure. The specification and examples are exemplary only, with the true scope and spirit of the present disclosure being indicated by the following claims.

It should be understood that the present disclosure is not limited to the precise structure that has been described above and shown in the drawings, and various modifications and changes may be made without departing from the scope thereof. The scope of the present disclosure is limited only by the appended claims.

The invention claimed is:

1. A paging method, comprising:
   determining, by a core network, a target tracking area where a terminal to be paged is currently located;
   determining, by the core network, target slice information of a target network slice corresponding to current service of the terminal;
   determining, by the core network, at least one target base station supporting the target network slice among a plurality of base stations in the target tracking area according to the target slice information; and
   sending, by the core network, first paging signaling for paging the terminal to the at least one target base station;
   wherein the plurality of base stations in the target tracking area comprise the at least one target base station and first base stations that support a network slice other than the target network slice;
   wherein the method further comprises:
   receiving slice information of one or more network slices supported by a respective base station of the plurality of base stations and reported by the respective base station, wherein determining the at least one target base station supporting the target network slice among the plurality of base stations in the target tracking area according to the target slice information comprises:
   taking, among the plurality of base stations in the target tracking area, at least one base station of which the slice information comprises the target slice information as the target base station;
   wherein receiving the slice information of the one or more network slices supported by the respective base station of the plurality of base stations and reported by the respective base station comprises: receiving, the slice information of the one or more network slices supported by the respective base station of the plurality of base stations, and reported by the respective base station through a target interface with the core network.

2. The paging method according to claim 1, wherein sending the first paging signaling for paging the terminal to the at least one target base station comprises:
   sending the first paging signaling for paging the terminal to a respective target base station of the at least one target base station through a target interface between the core network and the respective target base station.

3. The paging method according to claim 1, wherein the first paging signaling comprises a terminal identity of the terminal and the target slice information.

4. A paging method, comprising:
   receiving, by a base station, first paging signaling for paging a terminal, the first paging signaling being sent from a core network to the base station after determining that the base station is in a target tracking area where the terminal is currently located and supports a target network slice; and
   sending, by the base station, second paging signaling to page the terminal according to the first paging signaling;
   wherein at least one target base station is taken as the base station, wherein the at least one target base station is determined by the core network to support the target network slice among a plurality of base stations in the target tracking area, and wherein the plurality of base stations in the target tracking area comprise the at least one target base station and first base stations that support a network slice other than the target network slice;
   wherein a respective base station of the plurality of base stations in the target tracking area reports slice information of one or more network slices supported by the respective base station through a target interface with the core network, and wherein the core network takes, among the plurality of base stations, at least one base station of which the slice information comprises target slice information of the target network slice as the target base station.

5. The paging method according to claim 4, wherein the first paging signaling comprises a terminal identity of the terminal and the target slice information of the target network slice; and
   wherein sending the second paging signaling to page the terminal comprises:
   sending the second paging signaling carrying the terminal identity and the target slice information to page the terminal.

6. A core network, comprising:
   at least one processor; and
   a memory configured to store instructions executable by the at least one processor,
   wherein the processor is configured to:
   determine a target tracking area where a terminal to be paged is currently located;
   determine target slice information of a target network slice corresponding to current service of the terminal;
   determine at least one target base station supporting the target network slice among a plurality of base stations in the target tracking area according to the target slice information; and
   send first paging signaling for paging the terminal to the at least one target base station;
   wherein the plurality of base stations in the target tracking area comprise the at least one target base station and first base stations that support a network slice other than the target network slice;
   wherein the processor is further configured to:
   receive slice information of one or more network slices supported by a respective base station of the plurality of base stations and reported by the respective base station, wherein when determining the at least one target base station supporting the target network slice among the plurality of base stations in the target tracking area according to the target slice information, the processor is configured to: take, among the plurality of base stations in the target tracking area, at least one base station of which the slice information comprises the target slice information as the target base station;
   wherein when receiving the slice information of the one or more network slices supported by the respective base station of the plurality of base stations and reported by the respective base station, the processor is configured to: receive, the slice information of the one or more network slices supported by the respective base station of the plurality of base stations and reported by the respective base station through a target interface with the core network.

7. The core network according to claim 6, wherein when sending the first paging signaling for paging the terminal to the at least one target base station, the at least one processor is further configured to:
   send the first paging signaling for paging the terminal to a respective target base station of the at least one target base station through a target interface between the core network and the respective target base station.

8. The core network according to claim 6, wherein the first paging signaling comprises a terminal identity of the terminal and the target slice information.

9. A base station, comprising:
- at least one processor; and
- a memory configured to store instructions executable by the at least one processor,
- wherein the at least one processor is configured to execute the instructions to perform the paging method according to claim 6.

* * * * *